US012106727B2

(12) United States Patent
Chen

(10) Patent No.: US 12,106,727 B2
(45) Date of Patent: Oct. 1, 2024

(54) METHOD FOR CONFIGURING COMPENSATION LOOK-UP TABLE, METHOD FOR COMPENSATING DISPLAY PANEL, APPARATUS FOR CONFIGURING COMPENSATION LOOK-UP TABLE

(71) Applicant: KunShan Go-Visionox Opto-Electronics Co., Ltd, Jiangsu (CN)

(72) Inventor: Feng Chen, Kunshan (CN)

(73) Assignee: KunShan Go-Visionox Opto-Electronics Co., Ltd, Kunshan (CN)

(*) Notice: Subject to any disclaimer, the term of this patent is extended or adjusted under 35 U.S.C. 154(b) by 0 days.

(21) Appl. No.: 18/468,938

(22) Filed: Sep. 18, 2023

(65) Prior Publication Data

US 2024/0005887 A1 Jan. 4, 2024

Related U.S. Application Data

(63) Continuation of application No. PCT/CN2022/108307, filed on Jul. 27, 2022.

(30) Foreign Application Priority Data

Dec. 10, 2021 (CN) ......................... 202111510627.8

(51) Int. Cl.
*G09G 3/36* (2006.01)
*G09G 3/00* (2006.01)

(52) U.S. Cl.
CPC ........... *G09G 3/3607* (2013.01); *G09G 3/006* (2013.01); *G09G 2310/0243* (2013.01);
(Continued)

(58) Field of Classification Search
CPC ... G09G 3/36–3696; G09G 2310/0243; G09G 2310/0248; G09G 2310/0251;
(Continued)

(56) References Cited

U.S. PATENT DOCUMENTS

2006/0257134 A1* 11/2006 Huang ..................... G09G 3/20 396/287
2015/0042697 A1 2/2015 Park et al.
(Continued)

FOREIGN PATENT DOCUMENTS

CN 106847157 A 6/2017
CN 106898327 A 6/2017
(Continued)

OTHER PUBLICATIONS

International Search Report issued Oct. 10, 2022, in corresponding International Application No. PCT/CN2022/108307, 6pages.
(Continued)

*Primary Examiner* — Nathan Danielsen
(74) *Attorney, Agent, or Firm* — Maier & Maier, PLLC

(57) ABSTRACT

A method for configuring a compensation look-up table. The method includes: acquiring first gray scale data and second gray scale data of a target display panel, wherein the first gray scale data and the second gray scale data include a display gray scale value of a target gray scale of each pixel point of the target display panel at a first brightness and at a second brightness respectively; determining, according to an adjustable threshold range and at least one of the first gray scale data and the second gray scale data, Mura pixel points in the target display panel; calculating, based on the first gray scale data and the second gray scale data corresponding to the Mura pixel points, a target compensation gain coefficient; determining, from a plurality of preset compensation
(Continued)

look-up tables corresponding to a plurality of Mura levels, a target compensation look-up table.

18 Claims, 9 Drawing Sheets

(52) U.S. Cl.
CPC ............... *G09G 2320/0233* (2013.01); *G09G 2320/0271* (2013.01); *G09G 2320/0285* (2013.01); *G09G 2320/0693* (2013.01); *G09G 2360/16* (2013.01)

(58) Field of Classification Search
CPC ........... G09G 2310/06; G09G 2310/08; G09G 2320/02; G09G 2320/0233; G09G 2320/0242; G09G 2320/0271; G09G 2320/0276; G09G 2320/0285–0295; G09G 2320/0686; G09G 2320/0693
See application file for complete search history.

(56) References Cited

U.S. PATENT DOCUMENTS

| | | | | |
|---|---|---|---|---|
| 2016/0148582 | A1* | 5/2016 | Chung | G09G 3/3611 345/89 |
| 2018/0090102 | A1* | 3/2018 | Chappalli | G09G 5/003 |
| 2019/0325795 | A1 | 10/2019 | Chen et al. | |
| 2020/0013326 | A1* | 1/2020 | Zheng | G09G 3/20 |
| 2021/0264606 | A1 | 8/2021 | Wu | |
| 2021/0264833 | A1 | 8/2021 | Heo et al. | |

FOREIGN PATENT DOCUMENTS

| | | | |
|---|---|---|---|
| CN | 107221290 | A | 9/2017 |
| CN | 107799084 | A | 3/2018 |
| CN | 108877740 | A | 11/2018 |
| CN | 111243512 | A | 6/2020 |
| CN | 112530347 | A | 3/2021 |
| CN | 113314062 | A | 8/2021 |
| CN | 114203087 | A | 3/2022 |
| TW | 200945317 | A | 11/2009 |
| TW | 201709178 | A | 3/2017 |

OTHER PUBLICATIONS

Office Action issued on Nov. 4, 2022, in corresponding Chinese Application No. 202111510627.8, 10 pages.
Office Action issued on Apr. 27, 2023, in corresponding Taiwanese Application No. 111130095, 5 pages.

* cited by examiner

METHOD FOR CONFIGURING COMPENSATION LOOK-UP TABLE, METHOD FOR COMPENSATING DISPLAY PANEL, APPARATUS FOR CONFIGURING COMPENSATION LOOK-UP TABLE

CROSS-REFERENCE TO RELATED APPLICATIONS

The present application is a continuation of International Application No. PCT/CN2022/108307, filed on Jul. 27, 2022, which claims priority to Chinese Patent Application No. 202111510627.8 filed on Dec. 10, 2021, and entitled "METHOD, APPARATUS AND DEVICE FOR CONFIGURING COMPENSATION LOOK-UP TABLE, METHOD FOR COMPENSATING DISPLAY PANEL, AND STORAGE MEDIUM", both of are hereby incorporated by reference in their entireties.

TECHNICAL FIELD

The present application relates to the field of display technology, and particularly, to a method for configuring a compensation look-up table, a method for compensating a display panel, and an apparatus for configuring a compensation look-up table.

BACKGROUND

With the development of display technology, display panels are becoming widely used, and requirements on a display effect of the display panels are higher and higher. In a process for manufacturing a display panel, a Mura phenomenon occurs in the display panel. The Mura phenomenon refers to a phenomenon that brightnesses of display of the display panel are uneven, resulting in various stripes. Mura levels may be different among display panels due to a manufacturing process, a manufacturing material, and other factors, and may reflect a severity of the Mura phenomenon of the display panels. Different severities of the Mura phenomenon among the display panels cause that a Mura compensation algorithm cannot meet requirements for compensating the display panels with different Mura levels.

SUMMARY

Embodiments of the present application provide a method for configuring a compensation look-up table, a method for compensating a display panel, and an apparatus for configuring a compensation look-up table.

In a first aspect, the embodiments of the present application provide a method for configuring a compensation look-up table, and the method includes: acquiring first gray scale data and second gray scale data of a target display panel, wherein the first gray scale data includes a display gray scale value of a target gray scale of each pixel point of the target display panel at a first brightness, and the second gray scale data includes a display gray scale value of the target gray scale of each pixel point of the target display panel at a second brightness, and the second brightness is different from the first brightness; determining, according to an adjustable threshold range and at least one of the first gray scale data and the second gray scale data, one or more Mura pixel points in the target display panel, wherein a display gray scale value of the Mura pixel point exceeds the adjustable threshold range; calculating, based on the first gray scale data corresponding to the Mura pixel points and the second gray scale data corresponding to the Mura pixel points, a target compensation gain coefficient, wherein the target compensation gain coefficient is a compensation gain coefficient of display of the target display panel at the second brightness with respect to the display of the target display panel at the first brightness; determining, from a plurality of preset compensation look-up tables corresponding to a plurality of Mura levels, a target compensation look-up table, wherein the compensation look-up tables include corresponding relationships between brightnesses and compensation gain coefficients, and the target compensation look-up table matches the target compensation gain coefficient and is configured to be invoked to compensate the target display panel.

In a second aspect, the embodiments of the present application provide a method for compensating Mura of a display panel, and the method includes: acquiring a current brightness of the display panel; according to the current brightness, searching a compensation gain coefficient corresponding to the current brightness from a target compensation look-up table, wherein the target compensation look-up table includes a corresponding relationship between brightnesses and compensation gain coefficients, the target compensation look-up table is a compensation look-up table matching a target compensation gain coefficient among a plurality of compensation look-up tables corresponding to a plurality of Mura levels, the target compensation gain coefficient is determined based on first gray scale data and second gray scale data of one or more Mura pixel points in the display panel, the Mura pixel points are determined according to an adjustable threshold range and at least one of the first gray scale data and the second gray scale data, the first gray scale data includes a display gray scale value of a target gray scale of each pixel point of the display panel at a first brightness, and the second gray scale data includes a display gray scale value of the target gray scale of each pixel point of the display panel at a second brightness; and compensating the display panel by using the searched compensation gain coefficient corresponding to the current brightness, and the second brightness is different from the first brightness.

In a third aspect, the embodiments of the present application provide an apparatus for configuring a compensation look-up table, and the apparatus includes: a data acquisition module, configured to acquire first gray scale data and second gray scale data of a target display panel, wherein the first gray scale data includes a display gray scale value of a target gray scale of each pixel point of the target display panel at a first brightness, and the second gray scale data includes a display gray scale value of the target gray scale of each pixel point of the target display panel at a second brightness, and the second brightness is different from the first brightness; a pixel point determination module, configured to determine, according to an adjustable threshold range and at least one of the first gray scale data and the second gray scale data, one or more Mura pixel points in the target display panel, wherein a display gray scale value of the Mura pixel point exceeds the adjustable threshold range; a calculation module, configured to calculate, based on the first gray scale data corresponding to the Mura pixel points and the second gray scale data corresponding to the Mura pixel points, a target compensation gain coefficient, wherein the target compensation gain coefficient is a compensation gain coefficient of display of the target display panel at the second brightness with respect to the display of the target display panel at the first brightness; and a determination module, configured to determine, from a plurality of preset compensation look-up tables corresponding to a plurality of Mura levels, a target compensation look-up table, wherein the compensation look-up tables include corresponding relationships between brightnesses and compensation gain coefficients, and the target compensation look-up table matches the target compensation gain coefficient and is configured to be invoked to compensate the target display panel.

DETAILED DESCRIPTION

Features and exemplary embodiments of various aspects of the present application will be described in detail below. To make the objects, technical solutions and advantages of the present application clearer, the present application will be further described in detail below with reference to the accompanying drawings and specific embodiments. It is understood that the specific embodiments described herein are merely configured to explain the present application, rather than to limit the present application. For those skilled in the art, the present application can be implemented without some of these specific details. The following description of the embodiments is merely to provide a better understanding of the present application by illustrating the examples of the present application.

With the development of display technology, display panels are becoming widely used, and requirements on a display effect of the display panels are higher and higher. In a process for manufacturing a display panel, a Mura phenomenon occurs in the display panel. The Mura phenomenon refers to a phenomenon that brightnesses of display of the display panel are uneven, resulting in various stripes. A severity of the Mura phenomenon may be different among the display panels due to a manufacturing process, a manufacturing material, and other factors, that is, Mura levels among the display panels may be different. In the related art, a Mura compensation algorithm cannot meet compensation requirements of the display panels with different Mura levels, and thus the Mura compensation algorithm in the related art causes that a compensation effect of a part of the display panels is poor.

Embodiments of the present application provide a method for configuring a compensation look-up table, a method for compensating a display panel, and an apparatus for configuring a compensation look-up table, so that corresponding look-up tables (LUTs) can be used for display panels with different Mura levels, and the compensation look-up tables (LUTs) are configured to look up a compensation gain coefficient corresponding to each brightness. Using a compensation look-up table LUT corresponding to a Mura level of a display panel to compensate the display panel can meet requirements for compensating display panels with different Mura levels, thereby improving an effect of compensating a plurality of display panels.

A method, an apparatus and a device for configuring a compensation look-up table, a method for compensating a display panel, and a storage medium will be described below in sequence.

Figure 1:
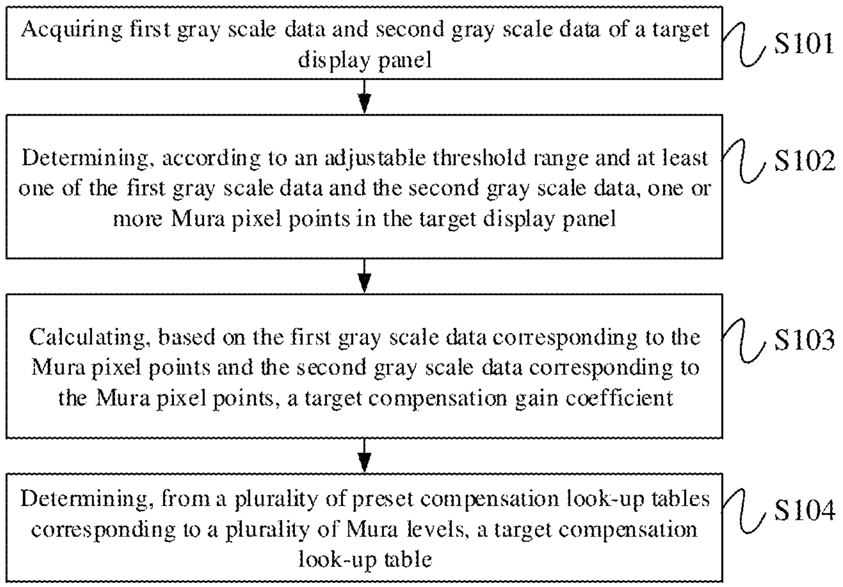
FIG. 1 is a schematic diagram of an embodiment of a method for configuring a compensation look-up table according to the present application.

In a first aspect of the present application, a method for configuring a compensation look-up table is provided and is applicable to an apparatus or a device for configuring a compensation look-up table, that is, the method for configuring a compensation look-up table may be executed by the apparatus or the device for configuring a compensation look-up table, which is not limited herein. FIG. 1 is a schematic diagram of one embodiment of a method for configuring a compensation look-up table according to the present application. As shown in FIG. 1, the method for configuring a compensation look-up table may include steps S101 to S104.

In step S101, first gray scale data and second gray scale data of a target display panel are acquired.

The first gray scale data includes a display gray scale value of a target gray scale of each pixel point of the target display panel at a first brightness. The second gray scale data includes a display gray scale value of the target gray scale of each pixel point of the target display panel at a second brightness. The target gray scale is a certain gray scale indicating an image displayed by the target display panel, and may be selected as any gray scale, which is not limited herein. For example, the target gray scale may be a 16 gray scale, a 32 gray scale, a 64 gray scale, a 128 gray scale, a 192 gray scale, a 224 gray scale, or other gray scales. Due to the Mura phenomenon existing in the display panel, actual display gray scale values of apart of pixel points in the display panel are different from target gray scale values. A display gray scale value is an actual display gray scale value of a pixel point. The pixel points in the target display panel may include sub-pixels in the target display panel.

In some examples, the first gray scale data may be stored in a form of a matrix, and the second gray scale data may also be stored in a form of a matrix. Each element in the matrix corresponding to the first gray scale data is a display gray scale value of the target gray scale of a pixel point at a position corresponding to the element at the first brightness. Each element in the matrix corresponding to the second gray scale data is a display gray scale value of the target gray scale of a pixel point at a position corresponding to the element at the second brightness. A position of an element in the matrix corresponds to a position of a pixel point in the target display panel.

The second brightness is different from the first brightness. In the embodiments of the present application, a compensation gain coefficient for compensation of the display panel at the second brightness with respect to compensation of the display panel at the first brightness is obtained based on display brightness gray scale values of a pixel point of the target display panel under two different display brightness conditions. In some examples, the first brightness may be greater than the second brightness. In other examples, the first brightness may be less than the second brightness.

In some examples, first brightness values of the pixel points of the target display panel may be collected under a condition that the target display panel displays an image of the target gray scale of the first brightness. The first brightness values of the pixel points of the target display panel are converted into the first gray scale data by using a conversion algorithm. Second brightness values of the pixel points of the target display panel are collected under a condition that the target display panel displays an image of the target gray scale of the second brightness. The second brightness values of the pixel points of the target display panel are converted into the second gray scale data by using a conversion algorithm.

The target display panel may be controlled to display the image of the target gray scale of the first brightness, and an optical collection device such as a charge coupled device (CCD) camera is configured to photograph an image displayed by the target display panel, so as to collect the first brightness values of the pixel points of the target display panel. The first brightness values are brightness values of the pixel points under a condition that the target display panel displays the image of the target gray scale of the first brightness, and the first brightness values may be implemented in a form of comma separated value (CSV) data, which is not limited herein. Similarly, the target display panel may be controlled to display the image of the target gray scale of the second brightness, and an optical collection device such as a CCD camera is configured to photograph an image displayed by the target display panel, so as to collect the second brightness values of the pixel points of the target display panel. The second brightness values are brightness values of the pixel points under a condition that the target display panel displays the image of the target gray scale of the second brightness, and the second brightness values may be implemented in a form of CSV data, which is not limited herein. The image of the target gray scale displayed by the display panel may be a monochrome image. For example, the monochrome image may be a green image, a blue image, a red image, or the like, which is not limited herein. The first brightness values and the second brightness values are respectively converted into the first gray scale data and the second gray scale data by the conversion algorithms for converting the brightnesses into the gray scales. The conversion algorithms are not limited herein.

Figure 2:
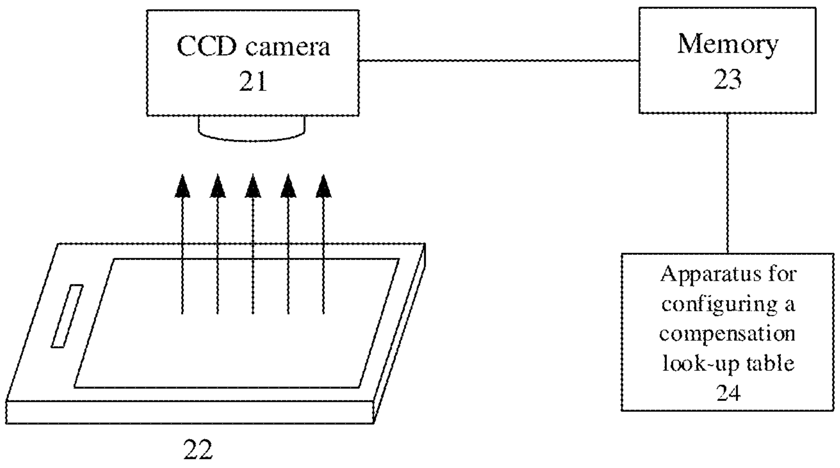
FIG. 2 is a schematic diagram of an example of photographing a target display panel according to an embodiment of the present application.

For example, FIG. 2 is a schematic diagram of an example of photographing a target display panel according to an embodiment of the present application. As shown in FIG. 2, a CCD camera 21 may be configured to photograph the target display panel 22, so as to photograph the image of the target gray scale of the first brightness displayed by the target display panel and the image of the target gray scale of the second brightness displayed by the target display panel, and to acquire the first brightness values and the second brightness values. The CCD camera 21 may store the first brightness values and the second brightness values in a memory 23. An apparatus for configuring a compensation look-up table 24 may acquire the first brightness values and the second brightness values from the memory 23 and execute the method for configuring a compensation look-up table in the embodiments of the present application. The memory 23 may be a device separate from the compensation look-up table, or may be integrated in the apparatus for configuring a compensation look-up table 24, which is not limited herein.

Figure 3:
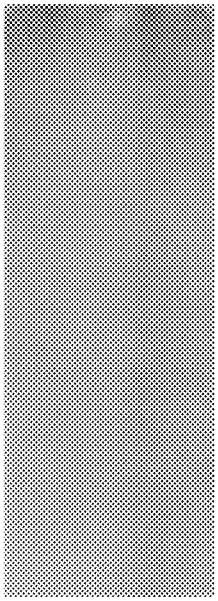
FIG. 3 is a schematic diagram of a photographed image of a target display panel displaying a target gray scale at a first brightness according to an embodiment of the present application.
Figure 4:
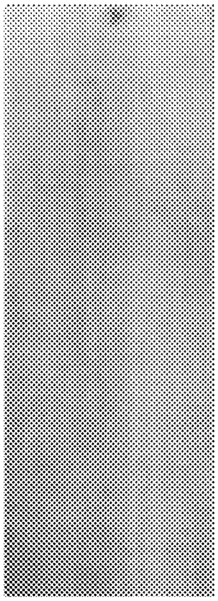
FIG. 4 is a display gray scale compensation image corresponding to the image shown in FIG. 3.
Figure 5:
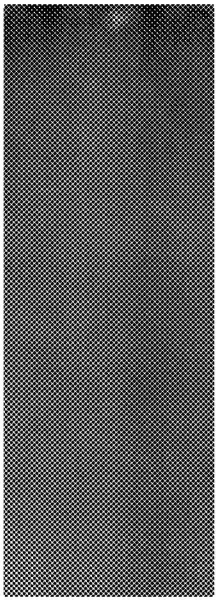
FIG. 5 is a schematic diagram of a photographed image of a target display panel displaying a target gray scale at a second brightness according to an embodiment of the present application.
Figure 6:
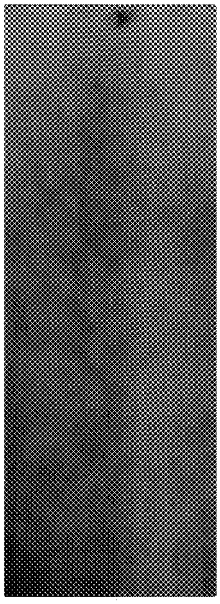
FIG. 6 is a display gray scale compensation image corresponding to the image shown in FIG. 5.

FIG. 3 is a schematic diagram of a photographed image of a target display panel displaying a target gray scale under a condition of the first brightness according to an embodiment of the present application. FIG. 4 is a display gray scale compensation image corresponding to the image shown in FIG. 3. A display gray scale value of each pixel point in FIG. 4 may be converted from the first brightness value of each pixel point in FIG. 3 using a conversion algorithm, for example, the conversion algorithm includes a compensation algorithm. FIG. 5 is a schematic diagram of a photographed image of a target display panel displaying a target gray scale under a condition of the second brightness according to an embodiment of the present application. FIG. 6 is a display gray scale compensation image corresponding to the image shown in FIG. 5. A display gray scale value of each pixel point in FIG. 6 may be converted from the second brightness value of each pixel point in FIG. 5 using a conversion algorithm, for example, the conversion algorithm includes a compensation algorithm. In some examples, the first brightness values and the second brightness values are respectively converted into the first gray scale data and the second gray scale data by the conversion algorithms, and corresponding display gray scale compensation images may not be generated.

In step S102, one or more Mura pixel points in the target display panel are determined according to an adjustable threshold range and at least one of the first gray scale data and the second gray scale data.

The Mura pixel points include pixel points having the Mura phenomenon in the target display panel, and a region formed by the Mura pixel points is a region where the Mura phenomenon occurs in the target display panel. In some examples, the Mura pixel points may include pixel points having a most severe Mura phenomenon in the target display panel, and a region formed by the Mura pixel points is a region where the Mura phenomenon is most severe in the target display panel. The adjustable threshold range is adjustable in determining the Mura pixel points in the target display panel, that is, the adjustable threshold range is variable. A center of the adjustable threshold range may be the target gray scale. In some examples, the adjustable threshold range may be centered on the target gray scale, and occupy 1 to 5 gray scale values along a positive direction and a negative direction, respectively, which is not limited herein. The positive direction is a direction greater than the target gray scale, and the negative direction is a direction less than the target gray scale, that is, the adjustable threshold range may be a range from a value which is 1 to 5 gray scale values less than the target gray scale to a value which is 1 to 5 gray scale values greater than the target gray scale. The adjustable threshold range is configured to select the Mura pixel points in the pixel points of the target display panel, and the adjustable threshold range may be gradually expanded before the Mura pixel points are selected. The display gray scale values of the Mura pixel points exceed the adjustable threshold range, that is, pixel points with display gray scale values exceeding the adjustable threshold range may be determined as the Mura pixel points.

In some examples, the Mura pixel points in the target display panel may be determined according to the first gray scale data and the adjustable threshold range. Specifically, pixel points whose display gray scale values of the target gray scale at the first brightness exceed the finally determined adjustable threshold range may be determined as the Mura pixel points.

Figure 7:
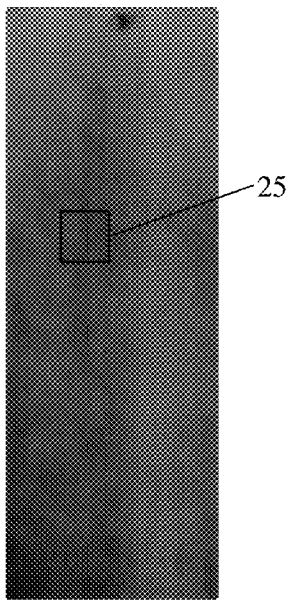
FIG. 7 is a schematic diagram of an example of a region where a Mura phenomenon occurs in the display gray scale compensation image shown in FIG. 6.

In other examples, the Mura pixel points in the target display panel may be determined according to the second gray scale data and the adjustable threshold range. Specifically, pixel points whose display gray scale values of the target gray scale at the second brightness exceed the finally determined adjustable threshold range may be determined as the Mura pixel points. For example, FIG. 7 is a schematic diagram of an example of a region where a Mura phenomenon occurs in the display gray scale compensation image shown in FIG. 6. As shown in FIG. 7, the region framed by a block 25 is a region where the Mura phenomenon occurs, and pixel points in the block 25 include the Mura pixel points. In some cases, the region framed by the block 25 may be a region where the Mura phenomenon is most severe.

In some other examples, the Mura pixel points in the target display panel may be determined according to the first gray scale data, the second gray scale data, and the adjustable threshold range. Specifically, an intersection of pixel points whose display gray scale values of the target gray scale at the first brightness exceed the finally determined adjustable threshold range and pixel points whose display gray scale values of the target gray scale at the second brightness exceed the finally determined adjustable threshold range may be determined as the Mura pixel points.

As shown in FIG. 5, the second brightness is less than the first brightness, and the Mura pixel points may be determined according to the second gray scale data and the adjustable threshold range, or the Mura pixel points may be determined according to the first gray scale data, the second gray scale data and the adjustable threshold range. Since the Mura phenomenon is more obvious under a condition that the display panel displays a relatively low brightness, the Mura pixel points determined and obtained according to the adjustable threshold range and the data including the second gray scale data are more accurate, thereby improving an accuracy of the obtained compensation look-up table corresponding to the target display panel.

In some examples, a number of candidate Mura pixel points is counted according to at least one of the first gray scale data and the second gray scale data, wherein the candidate Mura pixel points include a pixel point whose first gray scale data or second gray scale data exceeds the adjustable threshold range; under a condition that a ratio of the number of the candidate Mura pixel points to a number of pixel points of the target display panel is less than a preset screening ratio threshold, the candidate Mura pixel points are determined as the Mura pixel points; under a condition that the ratio of the number of the candidate Mura pixel points to the number of the pixel points of the target display panel is greater than or equal to the preset screening ratio threshold, the adjustable threshold range is expanded according to a preset step, and a number of the candidate Mura pixel points corresponding to the expanded adjustable threshold range is counted; and until a ratio of the number of the candidate Mura pixel points corresponding to the expanded adjustable threshold range to the number of the pixel points of the target display panel is less than the preset screening ratio threshold, the candidate Mura pixel points corresponding to the expanded adjustable threshold range are determined as the Mura pixel points.

In order to acquire the pixel points having the Mura phenomenon and even the pixel points having the most severe Mura phenomenon in the display panel, it is necessary to limit the number of Mura pixel points. Accordingly, the number of the candidate Mura pixels may be reduced by expanding the adjustable threshold range. For example, the adjustable threshold range may be gradually expanded according to the preset step, and the preset step may be set according to scenarios, demands, experiences, and the like, which is not limited herein. Under a condition that the number of the candidate Mura pixel points is reduced to a certain extent, the candidate Mura pixel points are determined as the Mura pixel points. The preset screening ratio threshold may be used to limit the extent to which the number of the candidate Mura pixels needs to be reduced, and the preset screening ratio threshold may be set according to scenarios, demands, experiences, and the like, which is not limited herein.

For example, the Mura pixel points are determined according to the second gray scale data and the adjustable threshold range. The target gray scale is a 128 gray scale, and the adjustable threshold range may be correspondingly set as (127, 129), that is, the adjustable threshold range is greater than a 127 gray scale and less than a 129 gray scale; the preset step is one gray scale; the preset screening ratio threshold may be 10%, 8%, 5%, 1%, 0.5%, 0.4%, 0.3%, 0.2%, or 0.1%. The preset screening ratio threshold of 1% is used as an example, pixel points whose second gray scale data exceed the adjustable threshold range (127, 129) are determined as the candidate Mura pixel points. Under a condition that the ratio of the number of the candidate Mura pixel points to the number of the pixel points of the target display panel is less than 1%, the candidate Mura pixel points may be directly used as the Mura pixel points. Under a condition that the ratio of the number of the candidate Mura pixel points to the number of the pixel points of the target display panel is greater than or equal to 1%, the adjustable threshold range is expanded to (126, 130), and pixel points whose second gray scale data exceed the adjustable threshold range (126, 130) are determined as the candidate Mura pixel points. Under a condition that a ratio of a number of the candidate Mura pixel points selected by using the adjustable threshold range (126, 130) to the number of the pixel points of the target display panel is less than 1%, the candidate Mura pixel points selected by using the adjustable threshold range (126, 130) are determined as the Mura pixel points. Under a condition that the ratio of the number of the candidate Mura pixel points selected by using the adjustable threshold range (126, 130) to the number of the pixel points of the target display panel is greater than or equal to 1%, the adjustable threshold range needs to be expanded again, and the adjustable threshold range is expanded to (125, 131), and so on, until a ratio of a number of the candidate Mura pixel points selected by using a certain expanded adjustable threshold range to the number of the pixel points of the target display panel is less than 1%, the candidate Mura pixel points selected by using the certain expanded adjustable threshold range are determined as the Mura pixel points.

In some examples, the first gray scale data and the second gray scale data are stored in a form of a matrix, and coordinates of the display gray scale values of the Mura pixel points in the matrix may be stored and recorded in a form of a two-dimensional array, which is not limited herein.

In step S103, a target compensation gain coefficient is calculated based on the first gray scale data corresponding to the Mura pixel points and the second gray scale data corresponding to the Mura pixel points.

The target compensation gain coefficient is a compensation gain coefficient of display of the target display panel at the second brightness with respect to display of the target display panel at the first brightness. The target compensation gain coefficient is a compensation gain coefficient corresponding to the target display panel displaying the second brightness. In some examples, a ratio of compensation data under a condition that the target display panel displays the image of the target gray scale of the second brightness to compensation data under a condition that the target display panel displays the image of the target gray scale of the first brightness is equal to the target compensation gain coefficient.

In some examples, a same process may be performed on the first gray scale data and the second gray scale data, respectively, and the target compensation gain coefficient may be calculated according to a first result data obtained by processing the first gray scale data and a second result data obtained by processing the second gray scale data. For example, a ratio of the first result data to the second result data may be determined as the target compensation gain coefficient, or a ratio of the second result data to the first result data may be determined as the target compensation gain coefficient.

In step S104, a target compensation look-up table is determined from a plurality of preset compensation look-up tables corresponding to a plurality of Mura levels.

The compensation look-up tables include corresponding relationships between brightnesses and compensation gain coefficients. For example, the compensation look-up table is shown as Table 1 below:

TABLE 1

| 51 register value | 0x00~ 0x1F | 0x1f~ 0x1FD | 0x1FE~ 0x2FF | 0x300~ 0x3FF | 0x400~ 0x4FF | 0x400~ 0x5FF | 0x600~ 0xFFE |
|---|---|---|---|---|---|---|---|
| compensation gain coefficient | [fe]-20<br>[b8]-1D<br>[b9]-1D<br>[ba]-1D<br>[fe]-00 | [fe]-20<br>[b8]-12<br>[b9]-12<br>[ba]-12<br>[fe]-00 | [fe]-20<br>[b8]-0D<br>[b9]-0D<br>[ba]-0D<br>[fe]-00 | [fe]-20<br>[b8]-0B<br>[b9]-0B<br>[ba]-0B<br>[fe]-00 | [fe]-20<br>[b8]-0A<br>[b9]-0A<br>[ba]-0A<br>[fe]-00 | [fe]-20<br>[b8]-09<br>[b9]-09<br>[ba]-09<br>[fe]-00 | [fe]-20<br>[b8]-08<br>[b9]-08<br>[ba]-08<br>[fe]-00 |

wherein the 51 register value characterizes a brightness. Table 1 shows the compensation gain coefficient of the display panel at each brightness for a certain Mura level.

Figure 8:
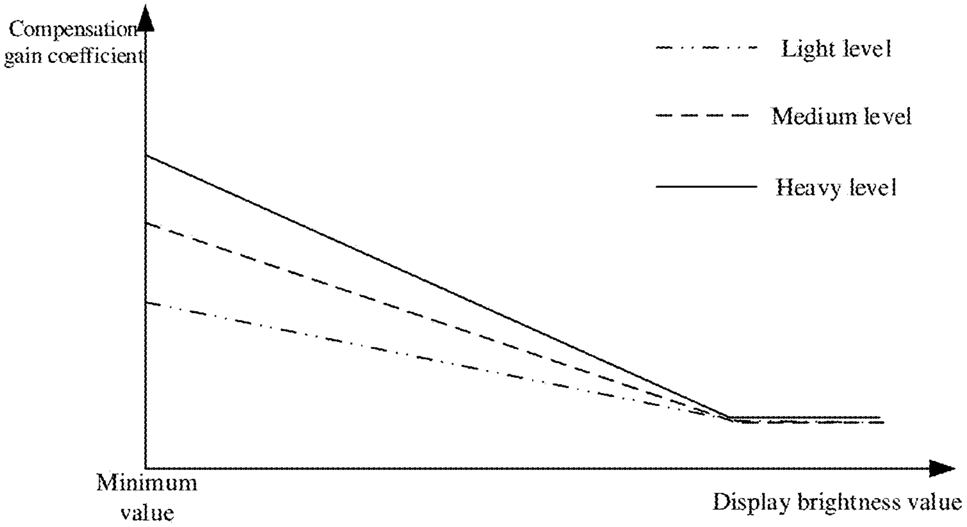
FIG. 8 is a graph of an example of corresponding relationships between brightnesses and compensation gain coefficients in compensation look-up tables (LUTs) corresponding to different Mura levels according to an embodiment of the present application.
Figure 9:
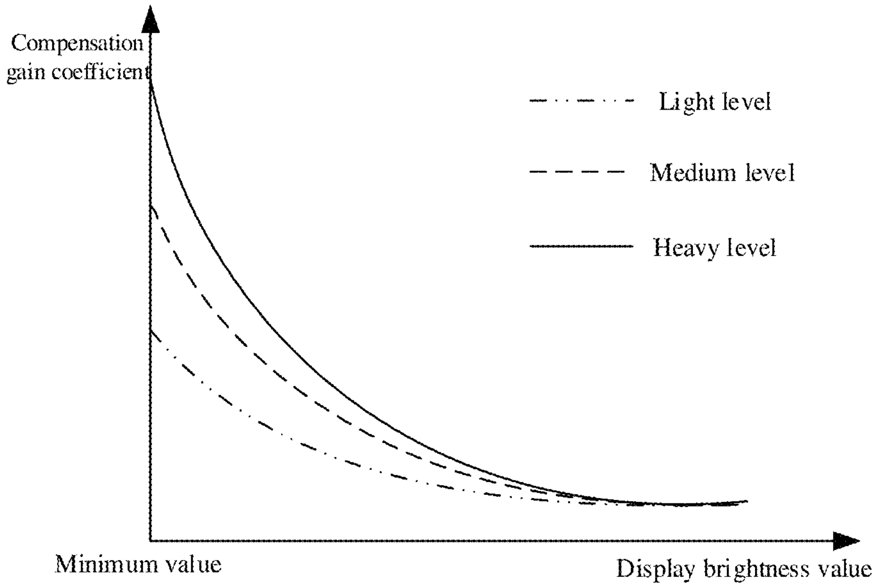
FIG. 9 is a graph of another example of corresponding relationships between brightnesses and compensation gain coefficients in compensation look-up tables (LUTs) corresponding to different Mura levels according to an embodiment of the present application.

The apparatus or the device for configuring a compensation look-up table may pre-store a plurality of compensation look-up tables (LUTs) corresponding to a plurality of Mura levels. The Mura levels and the compensation look-up tables (LUTs) are in a one-to-one correspondence. Corresponding relationships between brightnesses and compensation gain coefficients in the compensation look-up tables (LUTs) corresponding to different Mura levels may be different. For example, FIG. 8 is a graph of an example of corresponding relationships between brightnesses and compensation gain coefficients in the compensation look-up tables (LUTs) corresponding to different Mura levels according to an embodiment of the present application. FIG. 9 is a graph of another example of corresponding relationships between brightnesses and compensation gain coefficients in the compensation look-up tables (LUTs) corresponding to different Mura levels according to an embodiment of the present application. The corresponding relationships between brightnesses and compensation gain coefficients in the compensation look-up tables (LUTs) shown in FIG. 8 are linear relationships, such as $Y=aX+b$, Y is an ordinate representing the compensation gain coefficient (that is, a Gain value), X is an abscissa representing the brightness, the brightness is represented by a display brightness value (DBV), and a and b are constant coefficients. The corresponding relationships between brightnesses and compensation gain coefficients in the compensation look-up tables (LUTs) shown in FIG. 9 are quadratic relationship, such as $Y=aX^2+bX+c$, Y is an ordinate representing the compensation gain coefficient (that is a Gain value), X is an abscissa representing the brightness, the brightness is represented by a DBV, and a, b and c are constant coefficients. As shown in FIG. 8 and FIG. 9, the Mura levels may include a light level, a medium level, and a heavy level. Curves of the relationships between brightnesses and compensation gain coefficients corresponding to the light level, the medium level, and the heavy level are each different. Accordingly, under a condition that the display panels with different Mura levels are compensated, accurate compensation can be performed only by using the compensation look-up tables (LUTs) corresponding to their own Mura levels, thereby improving the display effects of the display panels.

The essence of a compensation look-up table (LUT) is a corresponding relationship between brightnesses and compensation gain coefficients, and is related to a Mura level. Each Mura level corresponds to one corresponding relationship between brightnesses and compensation gain coefficients, that is, one compensation look-up table (LUT). The plurality of compensation look-up tables corresponding to the plurality of Mura levels may be implemented as a plurality of tables, that is, each compensation look-up table is stored as one table. The plurality of compensation look-up tables (LUTs) corresponding to the plurality of Mura levels may also be implemented as a single table, and each compensation look-up table (LUT) may be implemented as a row of cells or a column of cells in the single table, so that the single table can accommodate the plurality of compensation look-up tables (LUTs) corresponding to the plurality of Mura levels. The Mura levels may be represented by just noticeable differences (JNDs). For example, the plurality of compensation look-up tables (LUTs) corresponding to the plurality of Mura levels implemented as the single table may be shown as Table 2 below:

TABLE 2

| 51 register value | 0x00~ 0x1F | 0x1f~ 0x1FD | 0x1FE~ 0x2FF | 0x300~ 0x3FF | 0x400~ 0x4FF | 0x400~ 0x5FF | 0x600~ 0xFFE | JND |
|---|---|---|---|---|---|---|---|---|
| compensation gain coefficient | [b8]-1D | [b8]-12 | [b8]-0D | [b8]-0B | [b8]-0A | [b8]-09 | [b8]-08 | 2.1 |
| | [b8]-1F | [b8]-14 | [b8]-0F | [b8]-0D | [b8]-0C | [b8]-0A | [b8]-08 | 2.2 |
| | [b8]-21 | [b8]-16 | [b8]-11 | [b8]-0F | [b8]-0D | [b8]-0B | [b8]-08 | 2.3 |
| | [b8]-23 | [b8]-18 | [b8]-13 | [b8]-10 | [b8]-0F | [b8]-0C | [b8]-08 | 2.4 |
| | [b8]-25 | [b8]-1A | [b8]-15 | [b8]-12 | [b8]-11 | [b8]-0C | [b8]-08 | 2.5 |

wherein the 51 register value characterizes the brightness. Table 2 shows the compensation gain coefficients of the display panels corresponding to five Mura levels (namely, five different JNDs) at each brightness. It may be seen from table 2 that, at a same brightness, the compensation gain coefficients of the display panels corresponding to the different Mura levels may be different.

The target compensation look-up table matches the target compensation gain coefficient, and is configured to be invoked to compensate the target display panel. That is, the target compensation look-up table is a look-up table matching the target compensation gain coefficient. For example, at a same brightness, the compensation gain coefficients in the target compensation look-up table are closest to the target compensation gain coefficient.

In the embodiments of the present application, the Mura pixel points having the Mura phenomenon in the target display panel are determined by the adjustable threshold range and at least one of the first gray scale data and the second gray scale data, and the target compensation gain coefficient of display of the target display panel at the second brightness with respect to display of the target display panel at the first brightness is obtained based on the first gray scale data corresponding to the Mura pixel points and the second gray scale data corresponding to the Mura pixel points, so as to determine, from the plurality of preset compensation look-up tables corresponding to the plurality of Mura levels, the target compensation look-up table matching the target compensation gain coefficient. The target compensation look-up table is configured to be invoked to compensate the target display panel. For different display panels, the compensation look-up table corresponding to the Mura level of each of the different display panels may be determined, so as to compensate a corresponding display panel using a corresponding compensation look-up table, so that requirements for compensating display panels with different Mura levels can be met, a compensation compatibility of display panels with different Mura levels is improved, and an effect of compensating a plurality of display panels is also improved.

In some examples, the first brightness is a standard brightness, that is a Normal brightness, and the second brightness is one third of the standard brightness. For example, the first brightness may be 300 nits and the second brightness may be 100 nits. A user often uses a display apparatus including a display panel indoors. Since light indoor is darker than light outdoor, a brightness of display of the display panel is lower in order to adapt to the environment. The Mura phenomenon is more obvious under a condition that the brightness of display of display panel is lower. In order to ensure that the compensation of the display panel at the lower brightness is more accurate, the Normal brightness may be selected as the first brightness, and the second brightness is one third of the first brightness (that is, ⅓ of the Normal brightness). The target compensation gain coefficient in the embodiments of the present application includes a compensation gain coefficient of display of the target display panel at ⅓ of the Normal brightness with respect to display of the target display panel at the Normal brightness, so that the target compensation look-up table determined according to the target compensation gain coefficient can be more suitable for the target display panel, and the compensation of the target display panel can be more accurate.

In some examples, the first brightness is the standard brightness, and the second brightness is a quarter of the standard brightness.

In some examples, the first brightness may be the standard brightness, and the second brightness may be one eighth to one third of the standard brightness.

In some examples, the first brightness may be greater than a half of a maximum brightness of the target display panel, and the second brightness may be less than a half of the maximum brightness.

In the embodiments of the present application, the specific values of the first brightness and the second brightness are not limited.

Figure 10:
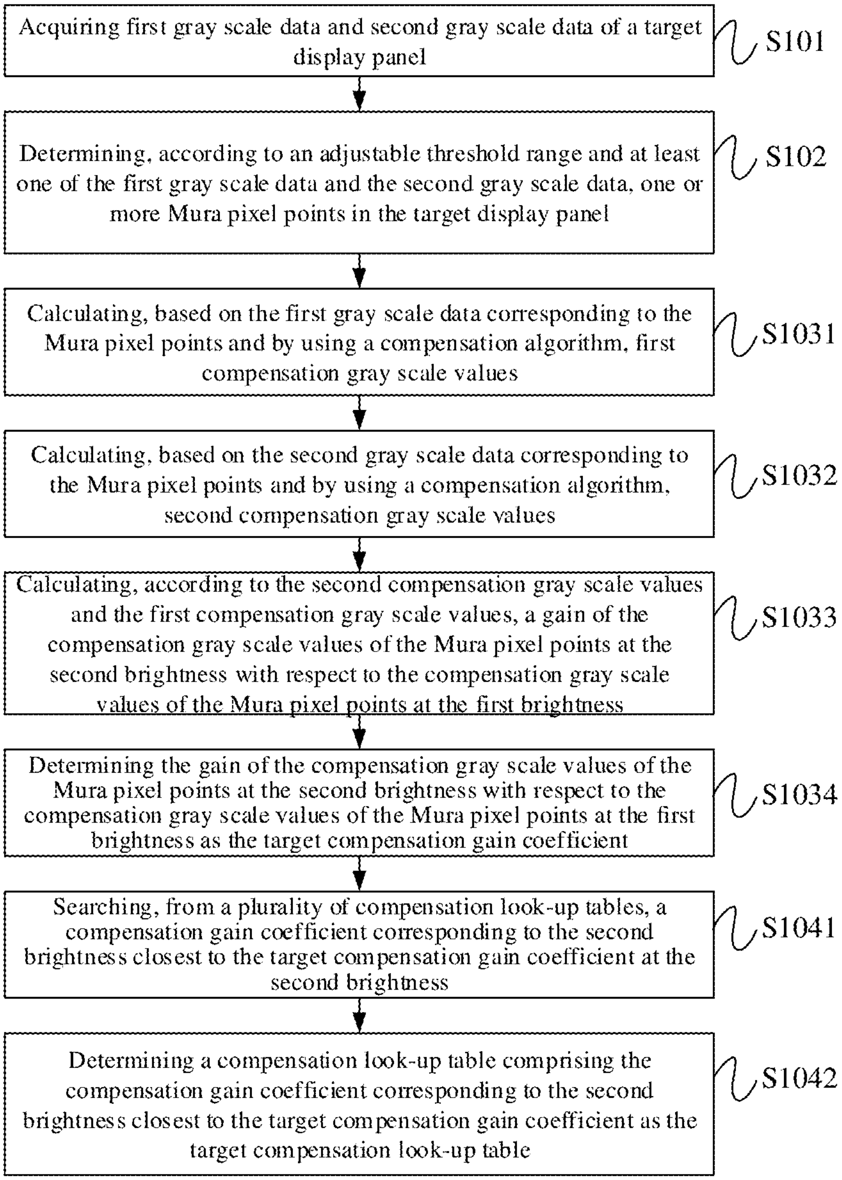
FIG. 10 is a flow diagram of another embodiment of a method for configuring a compensation look-up table according to the present application.

FIG. 10 is a flow diagram of another embodiment of a method for configuring a compensation look-up table according to the present application. FIG. 10 differs from FIG. 1 in that, step S103 in FIG. 1 may be subdivided into steps S1031 to S1034 in FIG. 10, and step S104 in FIG. 1 may be subdivided into steps S1041 and S1042 in FIG. 10.

In step S1031, first compensation gray scale values are calculated based on the first gray scale data corresponding to the Mura pixel points and by using a compensation algorithm.

The first compensation gray scale values include compensation gray scale values of the Mura pixel points at the first brightness. In some examples, the compensation gray scale values of the Mura pixel points at the first brightness may be obtained by using the compensation algorithm and according to display gray scale values of the target gray scale of the Mura pixel points at the first brightness and the target gray scale, or according to a display gray scale values of the target gray scale of the Mura pixel points at the first brightness and a corresponding desired gray scale value. A type and a manner of the compensation algorithm is not limited herein. The first compensation gray scale values may be stored in a form of an array, which is not limited herein.

In step S1032, second compensation gray scale values are calculated based on the second gray scale data corresponding to the Mura pixel points and by using a compensation algorithm.

The second compensation gray scale values include compensation gray scale values of the Mura pixel points at the second brightness. In some examples, the compensation gray scale values of the Mura pixel points at the second brightness may be obtained by using the compensation algorithm and according to display gray scale values of the target gray scale of the Mura pixel points at the second brightness and the target gray scale, or according to display gray scale values of the target gray scale of the Mura pixel points at the second brightness and a corresponding desired gray scale value. The compensation method in step S1032 is consistent with the compensation method in step S1031. The second compensation gray scale values may be stored in a form of an array, which is not limited herein.

Steps S1031 and S1032 may be executed sequentially or simultaneously, and an execution order of steps S1031 and step S1032 is not limited herein.

In step S1033, a gain of the compensation gray scale values of the Mura pixel points at the second brightness with respect to the compensation gray scale values of the Mura pixel points at the first brightness is calculated according to the second compensation gray scale values and the first compensation gray scale values.

The gain of the compensation gray scale values of the Mura pixel points at the second brightness with respect to the compensation gray scale values of the Mura pixel points at the first brightness can characterize the compensation gain coefficient of display of the target display panel at the second brightness with respect to display of the target display panel at the first brightness. The second compensation gray scale values and the first compensation gray scale values may be processed, respectively, and a ratio of data obtained by processing the second compensation gray scale values to data obtained by processing the first compensation gray scale values may be used as the gain of the compensation gray scale values of the Mura pixel points at the second brightness with respect to the compensation gray scale values of the Mura pixel points at the first brightness.

In some examples, the target compensation gain coefficient, the first compensation gray scale value and the second compensation gray scale value satisfy the following equation:

$$\text{Gain}' = \frac{\left(\frac{\sum_{i=1}^{N} Z2[i]^{\frac{1}{2}}}{N}\right)^2}{\left(\frac{\sum_{i=1}^{N} Z1[i]^{\frac{1}{2}}}{N}\right)^2} \quad (1)$$

wherein, Gain' is the target compensation gain coefficient; Z1[i] is the first compensation gray scale value corresponding to an $i^{th}$ Mura pixel point, that is, Z1[i] is a compensation gray scale value of the $i^{th}$ Mura pixel point at the first brightness; Z2[i] is the second compensation gray scale value corresponding to the $i^{th}$ Mura pixel point, that is, Z2[i] is a compensation gray scale value of the $i^{th}$ Mura pixel point at the second brightness; N is a total number of the Mura pixel points, i is an integer, and $1 \leq i \leq N$.

In step S1034, the gain of the compensation gray scale values of the Mura pixel points at the second brightness with respect to the compensation gray scale values of the Mura pixel points at the first brightness is determined as the target compensation gain coefficient.

In step S1041, a compensation gain coefficient corresponding to the second brightness closest to the target compensation gain coefficient at the second brightness is searched from a plurality of compensation look-up tables.

In step S1042, a compensation look-up table including the compensation gain coefficient corresponding to the second brightness closest to the target compensation gain coefficient is determined as the target compensation look-up table.

Under a condition that a compensation gain parameter equal to the target compensation gain coefficient exists in the compensation gain coefficients at the second brightness in the plurality of compensation lookup tables (LUTs), a compensation look-up table (LUT) including the compensation gain parameter equal to the target compensation gain coefficient at the second brightness may be determined as the target compensation lookup table.

Under a condition that a compensation gain parameter equal to the target compensation gain coefficient does not exist in the compensation gain coefficients at the second brightness in the plurality of compensation look-up tables (LUTs), a compensation gain parameter having a minimum absolute value of a difference from the target compensation gain coefficient at the second brightness is searched from the plurality of compensation look-up tables (LUTs), and a compensation look-up table (LUT) including the compensation gain parameter having the minimum absolute value of the difference from the target compensation gain coefficient at the second brightness is determined as the target compensation look-up table.

Figure 11:
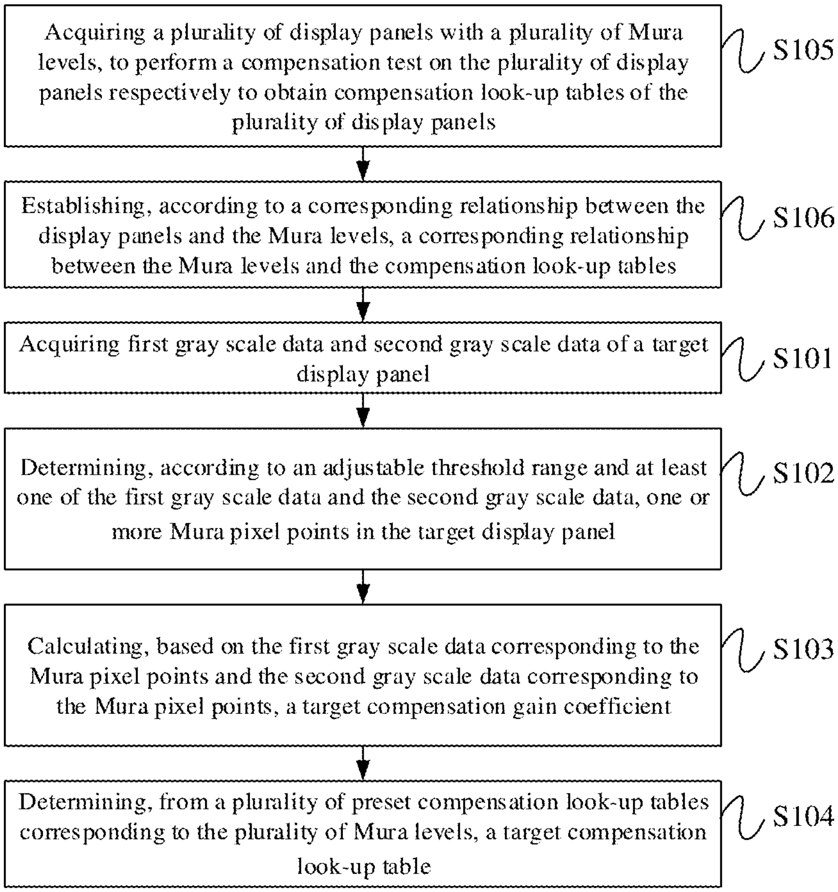
FIG. 11 is a flow diagram of yet another embodiment of a method for configuring a compensation look-up table according to the present application.

In some embodiments, before the above steps S101 to S104 are performed, corresponding relationships between the Mura levels and the compensation look-up tables may be pre-established to facilitate lookups in subsequent processes. FIG. 11 is a flow diagram of yet another embodiment of a method for configuring a compensation look-up table according to the present application. FIG. 11 differs from FIG. 1 in that the method for configuring a compensation look-up table shown in FIG. 11 may further include steps S105 and S106.

In step S105, a plurality of display panels with a plurality of Mura levels are acquired, and a compensation test is performed on the plurality of display panels respectively to obtain the compensation look-up tables of the plurality of display panels.

A small number of display panels may be acquired in advance, and a test is performed on the display panels to determine the Mura levels of the display panels. The compensation test is performed on the plurality of display panels respectively to obtain a corresponding relationship between brightnesses and compensation gain coefficients of each of the plurality of display panels, thereby obtaining a compensation look-up table (LUT) of each of the plurality of display panels.

In step S106, a corresponding relationship between the Mura levels and the compensation look-up tables is established according to a corresponding relationship between the display panels and the Mura levels.

The display panels have corresponding compensation look-up tables (LUTs), and the display panels also have a corresponding relationship with the Mura levels. According to the compensation look-up tables (LUTs) corresponding to the display panels, and the corresponding relationship between the display panels and the Mura levels, the corresponding relationship between the Mura levels and the compensation look-up tables may be established, so as to obtain the plurality of compensation look-up tables corresponding to the plurality of Mura levels in advance in step S104.

In some embodiments, in order to make the display panel directly use the target compensation look-up table to perform compensation after leaving the factory, the target compensation look-up table may be burnt into the target display panel after the target compensation look-up table is determined. After the target display panel leaves the factory, in a process of using the target display panel by a user, the target compensation look-up table burnt to the target display panel may be directly used to compensate display of the target display panel, so as to improve the display effect of the target display panel.

Figure 12:
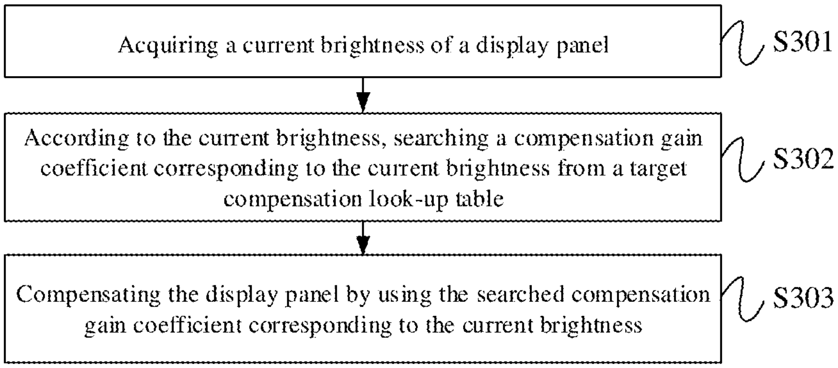
FIG. 12 is a flow diagram of an embodiment of a method for compensating Mura according to the present application.

A second aspect of the present application provides a method for compensating Mura of a display panel, which may be applied to the display panel. FIG. 12 is a flow diagram of an embodiment of a method for compensating Mura according to the present application. As shown in FIG. 12, the method for compensating Mura may include steps S301 to S303.

In step S301, a current brightness of the display panel is acquired.

In step S302, according to the current brightness, a compensation gain coefficient corresponding to the current brightness is searched from a target compensation look-up table.

The target compensation look-up table includes a corresponding relationship between brightnesses and compensation gain coefficients. The target compensation look-up table is a compensation look-up table matching a target compensation gain coefficient among a plurality of compensation look-up tables corresponding to a plurality of Mura levels, that is, the target compensation look-up table is a compensation look-up table matching the Mura level of the display panel. The target compensation gain coefficient is determined based on first gray scale data and second gray scale data of one or more Mura pixel points in the display panel. The Mura pixel points are determined according to an adjustable threshold range and at least one of the first gray scale data and the second gray scale data. The first gray scale data includes a display gray scale value of a target gray scale of each pixel point of the display panel at one brightness. The second gray scale data includes a display gray scale value of the target gray scale of each pixel point of the display panel at another brightness.

Specific contents of the target compensation look-up table may refer to relevant description of the above embodiments, which will not be repeated herein.

In step S303, the display panel is compensated by using the searched compensation gain coefficient corresponding to the current brightness.

In the embodiments of the present application, a target compensation look-up table corresponding to the display panel is a compensation look-up table corresponding to the Mura level of the display panel. The compensation look-up table includes a corresponding relationship between brightnesses and compensation gain coefficients. The target compensation look-up table corresponding to the display panel can be used to determine a compensation gain coefficient corresponding to the current brightness in the target compensation look-up table, and the compensation gain coefficient corresponding to the current brightness in the target compensation look-up table is used to compensate the display panel. Since the target compensation look-up table matches the Mura level of the display panel, requirements for compensating the display panel can be satisfied, thereby improving the effect of compensating the display panel.

Figure 13:
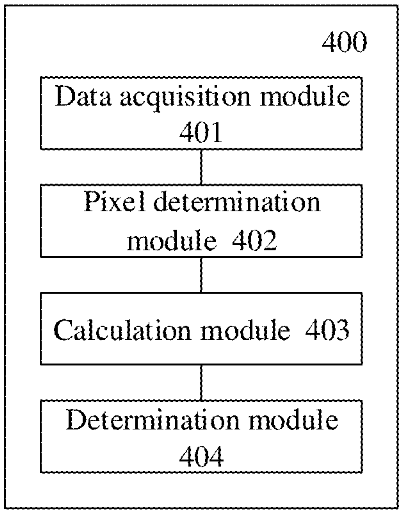
FIG. 13 is a schematic structural view of an embodiment of an apparatus for configuring a compensation look-up table according to the present application.

A third aspect of the present application provides an apparatus for configuring a compensation look-up table. FIG. 13 is a schematic structural view of an embodiment of an apparatus for configuring a compensation look-up table according to the present application. As shown in FIG. 13, the apparatus for configuring a compensation look-up table 400 may include a data acquisition module 401, a pixel point determination module 402, a calculation module 403 and a determination module 404.

The data acquisition module 401 may be configured to acquire first gray scale data and second gray scale data of a target display panel.

The first gray scale data includes a display gray scale value of a target gray scale of each pixel point of the target display panel at a first brightness. The second gray scale data includes a display gray scale value of the target gray scale of each pixel point of the target display panel at a second brightness. The second brightness is different from the first brightness.

In some examples, the first brightness is the standard brightness, and the second brightness is one third of the standard brightness.

In some examples, the first brightness is a standard brightness, and the second brightness is a quarter of the standard brightness.

In some examples, the first brightness is greater than the second brightness, and the second brightness is one eighth to one third of the standard brightness.

In some examples, the first brightness is greater than a half of a maximum brightness of the target display panel and the second brightness is less than a half of the maximum brightness.

The first brightness and the second brightness are not limited by the above description.

The pixel point determination module 402 may be configured to determine one or more Mura pixel points in the target display panel according to an adjustable threshold range and at least one of the first gray scale data and the second gray scale data.

A display gray scale value of the Mura pixel point exceeds the adjustable threshold range.

The calculation module 403 may be configured to calculate, based on the first gray scale data corresponding to the Mura pixel points and the second gray scale data corresponding to the Mura pixel points, a target compensation gain coefficient.

The target compensation gain coefficient is a compensation gain coefficient of display of the target display panel at the second brightness with respect to display of the target display panel at the first brightness.

The determination module 404 may be configured to determine, from a plurality of preset compensation look-up tables corresponding to a plurality of Mura levels, a target compensation look-up table.

The compensation look-up tables include corresponding relationships between brightnesses and compensation gain coefficients. The target compensation look-up table matches the target compensation gain coefficient, and is configured to be invoked to compensate the target display panel.

In the embodiments of the present application, the Mura pixel points having the Mura phenomenon in the target display panel are determined by the adjustable threshold range and at least one of the first gray scale data and the second gray scale data, and the target compensation gain coefficient of display of the target display panel at the second brightness with respect to display of the target display panel at the first brightness is obtained based on the first gray scale data corresponding to the Mura pixel points and the second gray scale data corresponding to the Mura pixel points, so as to determine, from the plurality of preset compensation look-up tables corresponding to the plurality of Mura levels, the target compensation look-up table matching the target compensation gain coefficient. The target compensation look-up table is configured to be invoked to compensate the target display panel. For different display panels, the compensation look-up table corresponding to the Mura level of each of the different display panels may be determined, so as to compensate a corresponding display panel using a corresponding compensation look-up table, so that requirements for compensating the display panels with the different Mura levels can be met, a compensation compatibility of the display panels with the different Mura levels is improved, and an effect of compensating a plurality of display panels is also improved.

In some embodiments, the calculation module 403 may be configured to: calculate, based on the first gray scale data corresponding to the Mura pixel points and by using a compensation algorithm, first compensation gray scale values, wherein the first compensation gray scale values include compensation gray scale values of the Mura pixel points at the first brightness; calculate, based on the second gray scale data corresponding to the Mura pixel points and by using a compensation algorithm, second compensation gray scale values, wherein the second compensation gray scale values include compensation gray scale values of the Mura pixel points at the second brightness; calculate, according to the second compensation gray scale values and the first compensation gray scale values, a gain of the compensation gray scale values of the Mura pixel points at the second brightness with respect to the compensation gray scale values of the Mura pixel points at the first brightness; determine the gain of the compensation gray scale values of the Mura pixel points at the second brightness with respect to the compensation gray scale values of the Mura pixel points at the first brightness as the target compensation gain coefficient.

In some examples, the target compensation gain coefficient, the first compensation gray scale value and the second compensation gray scale value satisfy the following equation:

$$\text{Gain}' = \frac{\left(\frac{\sum_{i=1}^{N} Z2[i]^{\frac{1}{2}}}{N}\right)^2}{\left(\frac{\sum_{i=1}^{N} Z1[i]^{\frac{1}{2}}}{N}\right)^2} \quad (1)$$

wherein, Gain' is the target compensation gain coefficient, Z1[i] is the first compensation gray scale value corresponding to an $i^{th}$ Mura pixel point, and Z2[i] is the second compensation gray scale value corresponding to the $i^{th}$ Mura pixel point, N is a total number of the Mura pixel points, i is an integer, and $1 \le i \le N$.

In some embodiments, the determination module 404 may be configured to: search, from the plurality of compensation look-up tables, a compensation gain coefficient corresponding to the second brightness closest to the target compensation gain coefficient at the second brightness; determine a compensation look-up table including the compensation gain coefficient corresponding to the second brightness closest to the target compensation gain coefficient as the target compensation look-up table.

In some embodiments, the pixel point determination module 402 may be configured to: count, according to at least one of the first gray scale data and the second gray scale data, a number of candidate Mura pixel points, wherein the candidate Mura pixel points include a pixel point whose first gray scale data or second gray scale data exceeds the adjustable threshold range; under a condition that a ratio of the number of the candidate Mura pixel points to a number of pixel points of the target display panel is less than a preset screening ratio threshold, determine the candidate Mura pixel points as the Mura pixel points; under a condition that the ratio of the number of the candidate Mura pixel points to the number of the pixel points of the target display panel is greater than or equal to the preset screening ratio threshold, expand the adjustable threshold range according to a preset step, to count a number of the candidate Mura pixel points corresponding to the expanded adjustable threshold range; and until a ratio of the number of the candidate Mura pixel points corresponding to the expanded adjustable threshold range to the number of the pixel points of the target display panel is less than the preset screening ratio threshold, determine the candidate Mura pixel points corresponding to the expanded adjustable threshold range as the Mura pixel points.

In some embodiments, the data acquisition module 401 may be configured to: collect first brightness values of pixel points of the target display panel under a condition that the target display panel displays an image of the target gray scale of the first brightness; convert the first brightness values of the pixel points of the target display panel into the first gray scale data by using a conversion algorithm; collect second brightness values of the pixel points of the target display panel under a condition that the target display panel displays an image of the target gray scale of the second brightness; convert the second brightness values of the pixel points of the target display panel into the second gray scale data by using a conversion algorithm.

Figure 14:
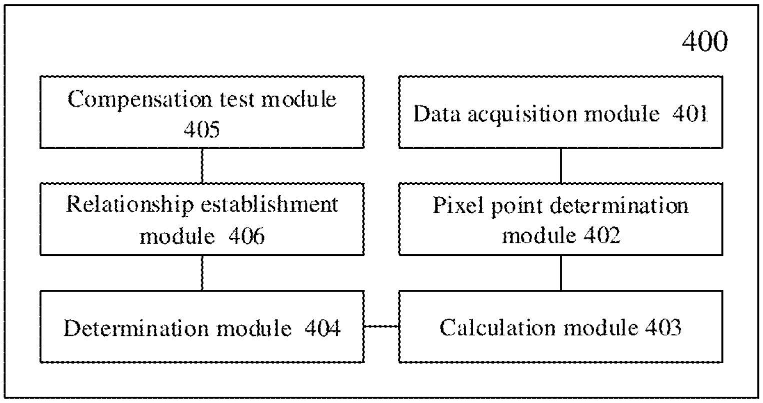
FIG. 14 is a schematic structural view of another embodiment of an apparatus for configuring a compensation look-up table according to the present application.

FIG. 14 is a schematic structural view of another embodiment of an apparatus for configuring a compensation look-up table according to the present application. FIG. 14 differs from FIG. 13 in that the apparatus for configuring a compensation look-up table 400 shown in FIG. 14 may further include a compensation test module 405 and a relationship establishment module 406.

The compensation test module 405 may be configured to acquire a plurality of display panels with a plurality of Mura levels, to perform a compensation test on the plurality of display panels respectively to obtain the compensation look-up tables of the plurality of display panels.

The relationship establishment module 406 may be configured to establish, according to a corresponding relationship between the display panels and the Mura levels, a corresponding relationship between the Mura levels and the compensation look-up tables.

Figure 15:
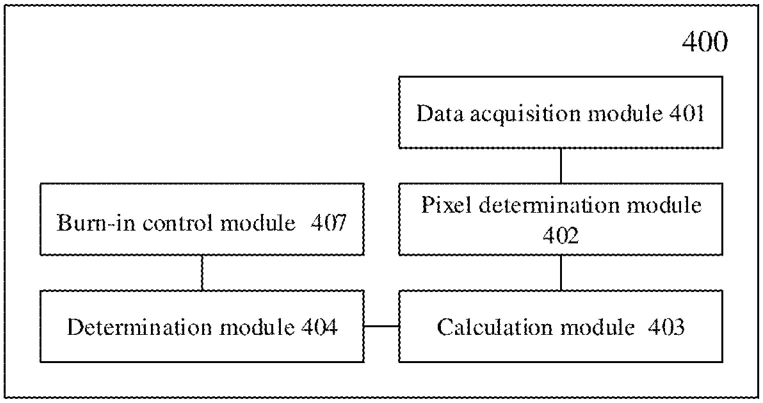
FIG. 15 is a schematic structural view of yet another embodiment of an apparatus for configuring a compensation look-up table according to the present application.

FIG. 15 is a schematic structural view of yet another embodiment of an apparatus for configuring a compensation look-up table according to the present application. FIG. 15 differs from FIG. 13 in that the apparatus for configuring a compensation look-up table 400 shown in FIG. 15 may further include a burn-in control module 407.

The burn-in control module 407 may be configured to burn the target compensation look-up table to the target display panel.

Figure 16:
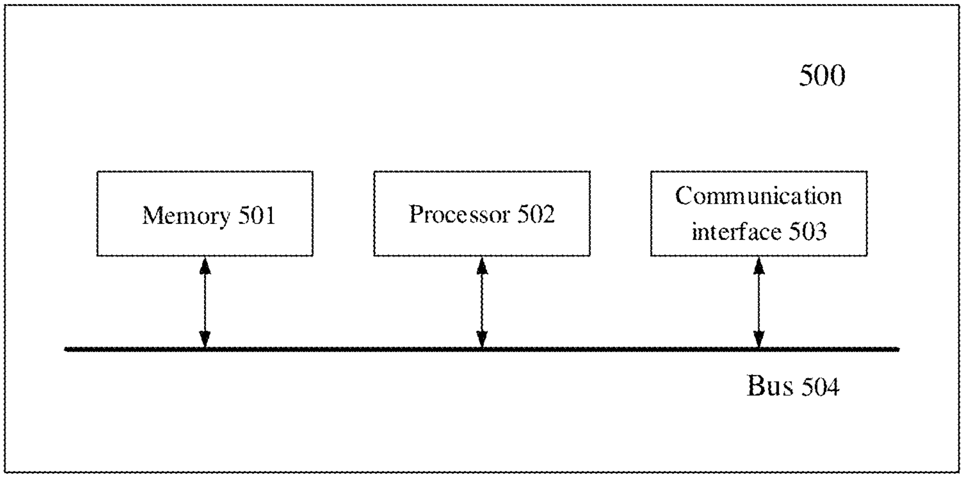
FIG. 16 is a schematic structural view of an embodiment of a device for configuring a compensation look-up table according to the present application.

A fourth aspect of the present application provides a device for configuring a compensation look-up table. FIG. 16 is a schematic structural view of an embodiment of a device for configuring a compensation look-up table according to the present application. As shown in FIG. 16, the device for configuring a compensation look-up table 500 includes a memory 501, a processor 502 and a computer program stored on the memory 501 and executable on the processor 502.

In one example, the above processor 502 may include a central processing unit (CPU), an Application Specific Integrated Circuit (ASIC), or one or more integrated circuits configured to implement the embodiments of the present application.

The memory 501 may include a Read-Only Memory (ROM), a Random Access Memory (RAM), a magnetic disk storage media device, an optical storage media device, a flash memory device, an electrical, optical or other physical/tangible memory storage device. Accordingly, a memory often includes one or more tangible (non-transitory) computer-readable storage media (for example, a memory device) encoded with software including computer-executable instructions, and the software, when executed (for example, by one or more processors), is operable to perform operations described with reference to the method for configuring a compensation look-up table according to the embodiments of the present application.

The processor 502 executes a computer program corresponding to executable program codes stored in the memory 501 by reading the executable program codes, so as to implement the method for configuring a compensation look-up table according to the above embodiments.

In some examples, the device for configuring a compensation look-up table 500 may further include a communication interface 503 and a bus 504. As shown in FIG. 16, the memory 501, the processor 502, and the communication interface 503 are connected through the bus 504 and achieve communication with each other.

The communication interface 503 is mainly configured to achieve communication among modules, apparatuses, units and/or devices in the embodiments of the present application. An input device and/or an output device may also be accessed through the communication interface 503.

The bus 504 includes hardware, software, or both, and couples components of the device for configuring a compensation look-up table 500 to each other. As an example rather than limitation, the bus 504 may include an Accelerated Graphics Port (AGP) or other graphics buses, an Enhanced Industry Standard Architecture (EISA) bus, a Front Side Bus (FSB), a Hyper Transport (HT) interconnect, an Industrial Standard Architecture (ISA) bus, a wireless band interconnect, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local Bus (VLB) bus or other suitable buses or the combination of two or more of these. When appropriate, the bus 504 may include one or more buses. Although the embodiments of the present application describe and illustrate a particular bus, any suitable bus or interconnect may be considered in the present application.

A fifth aspect of the present application provides an integrated circuit chip, that is, an IC chip. The IC chip may be burnt with the target compensation look-up table according to the above embodiments. The IC chip includes a processor and a communication interface coupled to the processor, and the processor is configured to execute programs or instructions to implement the method for compensating Mura according to the above embodiments.

A sixth aspect of the present application further provides a computer-readable storage medium stored thereon computer program instructions that, when executed by a processor, can implement the method for configuring a compensation look-up table according to the above embodiments and can achieve the same technical effect, which is not described herein in order to avoid repetition. The computer-readable storage medium may include a non-transitory computer-readable storage medium such as a read-only memory (ROM), a random access memory (RAM), a magnetic disk or an optical disk, and the like, which is not limited herein.

It should be clear that, various embodiments in the specification are described in a progressive way, and the same or similar parts of various embodiments may be referred to each other. Each embodiment focuses on the differences from other embodiments. For the embodiments of the apparatus, the device, the chip and the computer-readable storage medium, relevant contents may refer to the description portion of the embodiments of the method. The application is not limited to specific steps and structures described above and shown in the drawings. Those skilled in the art can make various changes, modifications and additions, or change the order between steps after understanding the gist of the present application. Moreover, for the sake of brevity, a detailed description of the known method and technology is omitted herein.

Aspects of the present application are described above with reference to flow diagrams and/or block diagrams of methods, devices (systems) and computer program products according to the embodiments of the present application. It should be understood that each block in the flow diagrams and/or the block diagrams, and a combination of various blocks in the flow diagrams and/or the block diagrams can be implemented by computer program instructions. These computer program instructions can be provided to a processor of a general purpose computer, a special purpose computer, or other programmable data processing apparatuses to produce a machine such that execution of the instructions via the processor of the computer or other programmable data processing apparatuses enables the implementation of the functions/actions specified in one or more blocks of the flow diagrams and/or the block diagrams. Such processor can be but is not limited to a general purpose processor, a special purpose processor, an application specific processor, or a field programmable logic circuit. It should also be understood that each block in the block diagrams and/or the flow diagrams, and the combination of various blocks in the block diagrams and/or the flow diagrams can also be implemented by special purpose hardware that performs specified functions or actions, or by the combination of the special purpose hardware and computer instructions.

Those skilled in the art should understand that, the above embodiments are all illustrative rather than restrictive. Different technical features recited in different embodiments may be combined to achieve beneficial effects. Those skilled in the art should be able to understand and implement other modified embodiments of the disclosed embodiments on the basis of studying the drawings, the description, and claims. In the claims, the term "comprising" does not exclude other devices or steps, the numeral word "a/an" does not exclude a plurality; the terms "first" and "second" are used to indicate names and are not used to indicate any particular order. Any reference sign in the claims should not be construed as limiting the protection scope. The functions of several parts recited in the claims may be implemented by a single hardware or software module. Some technical features are recited in different dependent claims, but it does not mean that these technical features cannot be combined to obtain beneficial effects.

What is claimed is:

1. A method for configuring a compensation look-up table, comprising:

acquiring first gray scale data and second gray scale data of a target display panel, wherein the first gray scale data comprises a display gray scale value of a target gray scale of each pixel point of the target display panel at a first brightness, and the second gray scale data comprises a display gray scale value of the target gray scale of each pixel point of the target display panel at a second brightness, and the second brightness is different from the first brightness;

determining, according to an adjustable threshold range and at least one of the first gray scale data and the second gray scale data, one or more Mura pixel points in the target display panel, wherein a display gray scale value of the Mura pixel point exceeds the adjustable threshold range;

calculating, based on the first gray scale data corresponding to the Mura pixel points and the second gray scale data corresponding to the Mura pixel points, a target compensation gain coefficient, wherein the target compensation gain coefficient is a compensation gain coefficient of display of the target display panel at the second brightness with respect to the display of the target display panel at the first brightness;

determining, from a plurality of preset compensation look-up tables corresponding to a plurality of Mura levels, a target compensation look-up table, wherein the compensation look-up tables comprise corresponding relationships between brightnesses and compensation gain coefficients, and the target compensation look-up table matches the target compensation gain coefficient and is configured to be invoked to compensate the target display panel.

2. The method according to claim 1, wherein the calculating, based on the first gray scale data corresponding to the Mura pixel points and the second gray scale data corresponding to the Mura pixel points, a target compensation gain coefficient comprises:

calculating, based on the first gray scale data corresponding to the Mura pixel points and by using a compensation algorithm, first compensation gray scale values, wherein the first compensation gray scale values comprise compensation gray scale values of the Mura pixel points at the first brightness;

calculating, based on the second gray scale data corresponding to the Mura pixel points and by using a compensation algorithm, second compensation gray scale values, wherein the second compensation gray scale values comprise compensation gray scale values of the Mura pixel points at the second brightness;

calculating, according to the second compensation gray scale values and the first compensation gray scale values, a gain of the compensation gray scale values of the Mura pixel points at the second brightness with respect to the compensation gray scale values of the Mura pixel points at the first brightness; and determining the gain of the compensation gray scale values of the Mura pixel points at the second brightness with respect to the compensation gray scale values of the Mura pixel points at the first brightness as the target compensation gain coefficient.

3. The method according to claim 2, wherein the target compensation gain coefficient, the first compensation gray scale value and the second compensation gray scale value satisfy the following equation:

$$\text{Gain}' = \frac{\left(\frac{\sum_{i=1}^{N} Z2[i]^{\frac{1}{2}}}{N}\right)^2}{\left(\frac{\sum_{i=1}^{N} Z1[i]^{\frac{1}{2}}}{N}\right)^2}$$

where Gain' is the target compensation gain coefficient, Z1[i] is the first compensation gray scale value corresponding to an $i^{th}$ Mura pixel point, and Z2 [i] is the second compensation gray scale value corresponding to the $i^{th}$ Mura pixel point, N is a total number of the Mura pixel points, i is an integer, and $1 \leq i \leq N$.

4. The method according to claim 2, wherein the calculating, based on the first gray scale data corresponding to the Mura pixel points and by using a compensation algorithm, first compensation gray scale values comprise:

obtaining, according to display gray scale values of the target gray scale of the Mura pixel points at the first brightness and the target gray scale and by using a compensation algorithm, the first compensation gray scale values; or obtaining, according to display gray scale values of the target gray scale of the Mura pixel points at the first brightness and corresponding desired gray scale values and by using a compensation algorithm, the first compensation gray scale values.

5. The method according to claim 2, wherein the calculating, based on the second gray scale data corresponding to the Mura pixel points and by using the compensation algorithm, second compensation gray scale values comprise:

obtaining, according to display gray scale values of the target gray scale of the Mura pixel points at the second brightness and the target gray scale and by using a compensation algorithm, the second compensation gray scale values; or obtaining, according to display gray scale values of the target gray scale of the Mura pixel points at the second brightness and corresponding desired gray scale values and by using a compensation algorithm, the second compensation gray scale values.

6. The method according to claim 1, wherein the determining, from the plurality of preset compensation look-up tables corresponding to the plurality of Mura levels, a target compensation look-up table comprises:

searching, from the plurality of compensation look-up tables, a compensation gain coefficient corresponding to the second brightness closest to the target compensation gain coefficient at the second brightness; and determining a compensation look-up table comprising the compensation gain coefficient corresponding to the second brightness closest to the target compensation gain coefficient as the target compensation look-up table.

7. The method according to claim 6, wherein under a condition that a compensation gain parameter equal to the target compensation gain coefficient exists in the compensation gain coefficients at the second brightness in the plurality of compensation look-up tables, determining a compensation look-up table comprising the compensation gain parameter equal to the target compensation gain coefficient at the second brightness as the target compensation look-up table.

8. The method according to claim 6, wherein under a condition that a compensation gain parameter equal to the target compensation gain coefficient does not exist in the compensation gain coefficients at the second brightness in the plurality of compensation look-up tables, searching, from the plurality of compensation look-up tables, a compensation gain parameter having a minimum absolute value of a difference from the target compensation gain coefficient at the second brightness, and determining a compensation look-up table comprising the compensation gain parameter having the minimum absolute value of the difference from the target compensation gain coefficient at the second brightness as the target compensation look-up table.

9. The method according to claim 6, wherein the first brightness is a standard brightness, and the second brightness is one third of the standard brightness; or the first brightness is a standard brightness, and the second brightness is a quarter of the standard brightness; or the first brightness is greater than the second brightness, and the second brightness is one eighth to one third of the standard brightness; or the first brightness is greater than a half of a maximum brightness of the target display panel, and the second brightness is less than a half of the maximum brightness.

10. The method according to claim 1, wherein the determining, according to the adjustable threshold range and at least one of the first gray scale data and the second gray scale data, one or more Mura pixel points in the target display panel comprises:

counting, according to at least one of the first gray scale data and the second gray scale data, a number of candidate Mura pixel points, wherein the candidate Mura pixel points comprise a pixel point whose first gray scale data or second gray scale data exceeds the adjustable threshold range;

under a condition that a ratio of the number of the candidate Mura pixel points to a number of pixel points of the target display panel is less than a preset screening ratio threshold, determining the candidate Mura pixel points as the Mura pixel points;

under a condition that the ratio of the number of the candidate Mura pixel points to the number of the pixel points of the target display panel is greater than or equal to the preset screening ratio threshold, expanding the adjustable threshold range according to a preset step, to count a number of the candidate Mura pixel points corresponding to the expanded adjustable threshold range; and until a ratio of the number of the candidate Mura pixel points corresponding to the expanded adjustable threshold range to the number of the pixel points of the target display panel is less than the preset screening ratio threshold, determining the candidate Mura pixel points corresponding to the expanded adjustable threshold range as the Mura pixel points.

11. The method according to claim 10, wherein the adjustable threshold range is a range from a value which is 1 to 5 gray scale values less than the target gray scale to a value which is 1 to 5 gray scale values greater than the target gray scale.

12. The method according to claim 1, wherein the acquiring first gray scale data and the second gray scale data of a target display panel comprises:

collecting first brightness values of pixel points of the target display panel under a condition that the target display panel displays an image of the target gray scale at the first brightness;

converting the first brightness values of the pixel points of the target display panel into the first gray scale data by using a conversion algorithm;

collecting second brightness values of the pixel points of the target display panel under a condition that the target display panel displays an image of the target gray scale at the second brightness;

converting the second brightness values of the pixel points of the target display panel into the second gray scale data by using a conversion algorithm.

13. The method according to claim 1, wherein before the acquiring first gray scale data and the second gray scale data of a target display panel, the method further comprises:

acquiring a plurality of display panels with a plurality of Mura levels, to perform a compensation test on the plurality of display panels respectively to obtain the compensation look-up tables of the plurality of display panels;

establishing, according to a corresponding relationship between the display panels and the Mura levels, a corresponding relationship between the Mura levels and the compensation look-up tables.

14. The method according to claim 1, wherein after the determining a target compensation look-up table, the method further comprises:

burning the target compensation look-up table to the target display panel.

15. The method according to claim 1, wherein the first gray scale data is stored in a form of a matrix, and each element in the matrix corresponding to the first gray scale data is a display gray scale value of the target gray scale of a pixel point on a corresponding position of the element at the first brightness;

the second gray scale data is stored in a form of a matrix, and each element in the matrix corresponding to the second gray scale data is a display gray scale value of the target gray scale of a pixel point on a corresponding position of the element at the second brightness.

16. The method according to claim 1, wherein the determining, according to an adjustable threshold range and at least one of the first gray scale data and the second gray scale data, one or more Mura pixel points in the target display panel comprises:

determining pixel points whose display gray scale values of the target gray scale at the second brightness exceed the adjustable threshold range as the Mura pixel points; or determining an intersection of pixel points whose display gray scale values of the target gray scale at the first brightness exceed the adjustable threshold range and pixel points whose display gray scale values of the target gray scale at the second brightness exceed the adjustable threshold range as the Mura pixel points.

17. A method for compensating Mura of a display panel, comprising:

acquiring a current brightness of the display panel;

according to the current brightness, searching a compensation gain coefficient corresponding to the current brightness from a target compensation look-up table, wherein the target compensation look-up table comprises a corresponding relationship between brightnesses and compensation gain coefficients, the target compensation look-up table is a compensation look-up table matching a target compensation gain coefficient among a plurality of compensation look-up tables corresponding to a plurality of Mura levels, the target compensation gain coefficient is determined based on first gray scale data and second gray scale data of one or more Mura pixel points in the display panel, the Mura pixel points are determined according to an adjustable threshold range and at least one of the first gray scale data and the second gray scale data, the first gray scale data comprises a display gray scale value of a target gray scale of each pixel point of the display panel at a first brightness, and the second gray scale data comprises a display gray scale value of the target gray scale of each pixel point of the display panel at a second brightness, and the second brightness is different from the first brightness; and compensating the display panel by using the searched compensation gain coefficient corresponding to the current brightness.

18. An apparatus for configuring a compensation look-up table, comprising:

a data acquisition module, configured to: acquire first gray scale data and second gray scale data of a target display panel, wherein the first gray scale data comprises a display gray scale value of a target gray scale of each pixel point of the target display panel at a first brightness, and the second gray scale data comprises a display gray scale value of the target gray scale of each pixel point of the target display panel at a second brightness, and the second brightness is different from the first brightness;

a pixel point determination module, configured to: determine, according to an adjustable threshold range and at least one of the first gray scale data and the second gray scale data, one or more Mura pixel points in the target display panel, wherein a display gray scale value of the Mura pixel point exceeds the adjustable threshold range;

a calculation module, configured to: calculate, based on the first gray scale data corresponding to the Mura pixel points and the second gray scale data corresponding to the Mura pixel points, a target compensation gain coefficient, wherein the target compensation gain coefficient is a compensation gain coefficient of display of the target display panel at the second brightness with respect to the display of the target display panel at the first brightness; and a determination module, configured to: determine, from a plurality of preset compensation look-up tables corresponding to a plurality of Mura levels, a target compensation look-up table, wherein the compensation look-up tables comprise corresponding relationships between brightnesses and compensation gain coefficients, and the target compensation look-up table matches the target compensation gain coefficient and is configured to be invoked to compensate the target display panel.

* * * * *